3,312,556
LOW TEMPERATURE FUSIBLE GLASS
Mitsuru Oikawa, Suginami-ku, Tokyo-to, and Tadao Okabe, Mobara-shi, Japan, assignors to Kabushiki Kaisha Hitachi Seisakusho, Tokyo-to, Japan, a joint-stock company of Japan
No Drawing. Filed May 15, 1963, Ser. No. 280,738
Claims priority, application Japan, May 18, 1962, 37/19,736
1 Claim. (Cl. 106—54)

The present invention relates to glasses, and more particularly it relates to a new glass fusible at low temperature which has highly desirable features, particularly for forming phosphor face on surfaces of electron tubes.

In general, for phosphor face plates of cathode-ray tubes and other electron tubes, phosphor face surfaces formed by molding phosphors on the glass tube surfaces with a binder of a substance such as water glass or a suitable synthetic resin have heretofore been used widely.

However, in conventional electron tubes in which such a binder, for example, water glass, is used, there has been the disadvantage of poor adhesivity, wherefore the phosphor has peeled off in a short time. In the case wherein a binder of synthetic resin such as a silicone is used, the residual solvent, for example, toluene, causes defects such as lowering of the degree of vacuum within the tube after sealing because of its high vapor pressure. Such defects cause disadvantageously low yield of the product, the maximum yield obtainable being of the order of 20 percent.

Broadly stated, it is an object of the present invention to provide a new glass fusible at low temperature for application of phosphors wherein the above-stated disadvantages have been eliminated.

The foregoing object and other objects and advantages as are indicated hereinafter have been achieved by the present invention, which, briefly described, provides a new glass produced by mixing and melting together from 84 to 87 percent of a low temperature fusible network former composed, principally, of 60 to 70 percent of $B_2O_3$, 4 to 8 percent of $SiO_2$, 5 to 10 percent of $K_2O$ (or $Na_2O$, or $K_2O+Na_2O$), and 5 to 10 percent of BaO (or CaO, or BaO+CaO) and from 13 to 16 percent of a network modifier which is composed of ZnO and $Li_2O$ and is caused to contribute to balancing of thermal expansion, all stated percentages being by weight. The constituent proportions by weight of the ZnO and $Li_2O$ in the above-said network modifier are, respectively, 60 to 50 parts and 40 to 50 parts.

In the glass of the present invention having the above-described composition, the low temperature component of $B_2O_3$ is substantially increased (60 percent or more) in comparison with the $SiO_2$, which, in general, functions to elevate the melting points of glasses. For this reason, the glass of this invention is readily fusible at a temperature of 600° C. or lower, at which the phosphor, for example, ZnS, is not damaged. $B_2O_3$, itself, is a component which has a small value for the so-called Mayer-Havas factor of thermal expansion relating to compositions of glasses in general. For this reason, in the case when the $B_2O_3$ content is excessive, it becomes impossible to attain, by adjusting the contents of the other constituents, good matching between the coefficient of thermal expansion of the glass base structure and that of electron tube wall or the phosphor layer base-plate glass forming the base-plate for supporting the phosphor layer. The present invention, however, provides a glass wherein the $B_2O_3$ content is caused to be 70 percent or less, whereby a glass having a coefficient of thermal expansion which is highly suitable for intimate bonding to the abovesaid phosphor layer base-plate glass is obtained.

For the purpose of obtaining a large coefficient of thermal expansion of the glass and, at the same time, obtaining so-called stability of the glass network structure and fusibility at a low temperature, the $SiO_2$ content is preferably from 4 to 8 percent.

While $K_2O$ or $Na_2O$ has a substantially large factor of thermal expansion and, moreover, is capable of imparting low temperature fusibility, it is desirable to limit the content of $K_2O$ or $Na_2O$ to 5 to 10 percent since both have low chemical resistivity. It is also desirable to cause the content of BaO or CaO, each of which has a factor of thermal expansion which is larger than those of substances other than $Na_2O$ and $K_2O$ and, moreover, has a low temperature component, to be approximately from 5 to 10 percent in consideration of the aforesaid content of the $K_2O$ or $Na_2O$.

The range of content, with respect to the network former, of the network modifier $ZnO+Li_2O$ whereby, as a result of adding the network modifier to the network former of the above-stated compositional ranges, and by varying the ratio of the ZnO content to the $Li_2O$ content, the coefficient of thermal expansion of the glass with respect to the phosphor layer base-plate glass can be readily adjusted to match well is from 13 to 16 percent.

In general, the Mayer-Havas factor of thermal expansion relating to glass compositions is 2.1 for ZnO and 2.0 for $Li_2O$. Since these two values differ only slightly, the network former has a coefficient of thermal expansion substantially approaching that of the phosphor layer base-plate glass and, at the same time, is fusible at a low temperature. Accordingly, by finely adjusting the ratio of the ZnO content to the $Li_2O$ content within the compositional range of network modifier relative to the said network former, it is readily possible to adjust the coefficient of thermal expansion of the glass to be produced to match well the coefficient of thermal expansion of the aforesaid phosphor layer base-plate glass.

In the fluorescent surface part of an ordinary electron tube structure on which a phosphor layer is formed, the low temperature fusible glass of the present invention is applied as a layer (hereinafter referred to as the second layer) which is filled with a fluorescent substance and provided on the surface of a layer (hereinafter referred to as the first layer) of a phosphor layer base-plate glass, and an additional layer (hereinafter referred to as the third layer) of only the low temperature fusible glass of this invention is provided over the said second layer for the purpose of providing the said second layer with a smooth surface and, at the same time, of protecting the same. Ordinarily, with respect to the coefficient of linear thermal expansion, denoted herein by $\beta_1$, of the said first layer which is of the order of, for example, $103 \times 10^{-7}$, the coefficient of linear thermal expansion, denoted herein by $\beta_2$, of the said second layer which has the low temperature fusible glass of the present invention as its principal constituent is of the order of, for example, $70 \times 10^{-7}$. Moreover, the coefficient of linear thermal expansion, herein denoted by $\beta_3$, of the third layer consisting of only the low temperature fusible glass of this invention becomes approximately $85 \times 10^{-7}$. The combination of layers then have the relationship of $\beta_1 > \beta_2 < \beta_3$. Accordingly, the effective result in this case is that, coupled with the fact that the second layer which is weak in tension is interposed between the first and third layers, the second layer is constantly subjected to force acting in the direction opposite to that of tension, that is, in the direction of compression. Consequently, the use of the glass of the present invention affords the highly advantageous feature of firm adhesion to the phosphor base-plate glass and, at the same time, substantial increase in the mechanical strength of the second layer itself.

Furthermore, the composition according to the present invention produces a glass which has high adhesivity with respect to the phosphor layer base-plate glass forming the electron tube wall or the base-plate of the phosphor layer, and which, moreover has the combination of excellent physical and chemical properties with low vapor pressure.

In one embodiment of the invention, a representative example of the afore-mentioned composition is produced by causing a network former composed of 68 percent of $B_2O_3$, 5 percent of $SiO_2$, 7 percent of BaO, and 6 percent of $K_2O$ to contain a network modifier composed of 6.16 to 6.72 percent $Li_2O$ and 7.84 to 7.28 percent of ZnO, all percentages being by weight, whereby the desired glass is obtained.

Furthermore, it has been found that a glass particularly having the composition by weight of 67 percent of $B_2O_3$, 6 percent of $SiO_2$, 7 percent of $K_2O$, 6 percent of BaO, 7.5 percent of ZnO, and 6.5 percent of $Li_2O$ is the optimum glass for use as a binder for forming a fluorescent surface on the phosphor layer base-plate glass (so-called soda glass with a coefficient of linear expansion of $(103 \pm 2) \times 10^{-7}$) for electron tubes for general use.

As will be apparent from the foregoing description, the present invention provides a new glass which is fusible at a low temperature such that a phosphor to be used in conjunction therewith is not damaged by heat, and which has a low vapour pressure such that there is little deterioration of the fluorescent surface subsequent to sealing of an electron tube in which the said glass is used. At the same time, the said glass has high adhesivity with little possibility of the phosphor layer peeling off and, moreover, can be matched well in coefficient of thermal expansion with the phosphor layer base-plate glass to which the said glass of this invention is to be bonded. Furthermore, the said glass does not contain any SnO or PbO, which are harmful to the phosphor, as in the case of ordinary optical glass. At the same time, the glass of this invention has the additional advantages of being producible in a relatively simple manner and being a highly effective, low temperature fusible glass, whereby the yield of a product thereof which is provided with a phosphor layer is approximately 100 percent.

Since it is obvious that changes and modifications can be made in the above described details without departing from the nature and spirit of the invention, it is to be understood that the invention is not to be limited to the details described herein except as set forth in the appended claim.

What is claimed is:

A low temperature fusible glass comprising a network former composed of 60 to 70 percent of $B_2O_3$, 4 to 8 percent of $SiO_2$, 5 to 10 percent of at least one constituent selected from the group consisting of $K_2O$ and $Na_2O$, and 5 to 10 percent of at least one constituent selected from the group consisting of BaO and CaO, and a network modifier composed of ZnO and $Li_2O$, the content of the said $Li_2O$ being 40 to 50 percent of the said network modifier, 13 to 16 percent of the said network modifier being caused to form the composition of the glass with 87 to 84 percent of the said network former, all stated percentages being by weight.

References Cited by the Examiner

UNITED STATES PATENTS 2,774,737   12/1956   Mager _____ 106—48

HELEN M. McCARTHY, *Primary Examiner.*

TOBIAS E. LEVOW, *Examiner.*